UNITED STATES PATENT OFFICE.

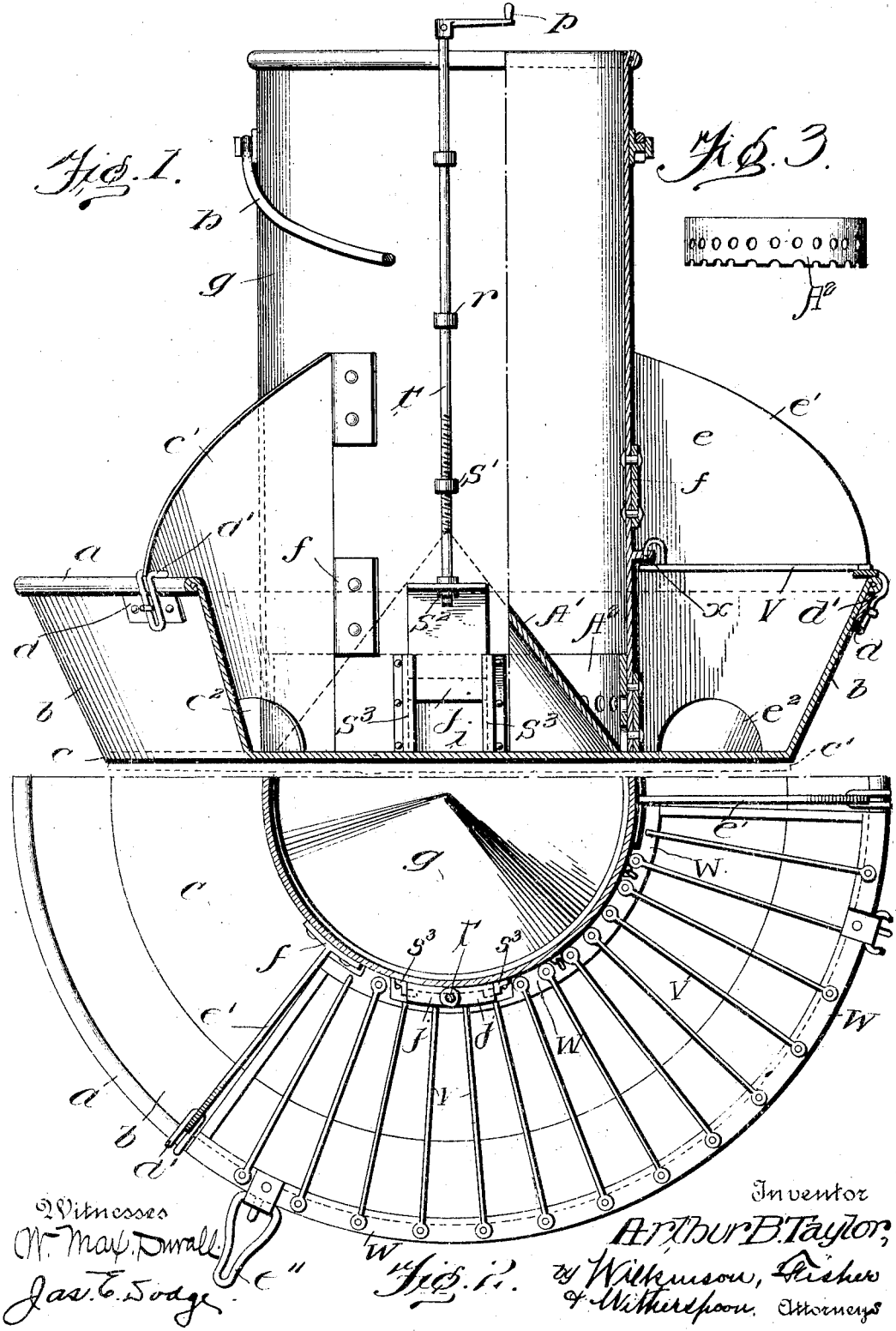

ARTHUR BERNARD TAYLOR, OF MORWELL, VICTORIA, AUSTRALIA.

ANIMAL FEED-TROUGH.

984,980. Specification of Letters Patent. Patented Feb. 21, 1911.

Application filed October 25, 1909. Serial No. 524,579.

*To all whom it may concern:*

Be it known that I, ARTHUR BERNARD TAYLOR, a subject of the King of Great Britain and Ireland, residing at Morwell, Gippsland, in the State of Victoria, Commonwealth of Australia, have invented certain new and useful Improvements in Animal Feed-Troughs; and I do hereby declare the following to be a full, clear, and exact description of the invention, such as will enable others skilled in the art to which it appertains to make and use the same.

This invention relates to sanitary feeding devices for animals, so constructed that the animals, and especially pigs, of about the same or of quite different sizes may feed conveniently from it; among other animals feedable from the device or trough are calves.

Referring now mainly to pigs these are by my arrangements of parts restrained from getting their feet into the dish containing the food, and will be unable to obstruct easy supplying of food to the vessel provided as a supply receptacle of said food to the feeding dish, and unable to prevent the continuous or intermittent delivery to the dish of food. They will be unable to upset the device, foul the food, or prevent each other reaching the latter; such prevention is of importance.

My construction allows of food storage and regulated food supply; is cheap and compact, and allows of a comparatively large number of animals being speedily fed. It will vary somewhat to suit the kind of animal to be fed; for pigs the dish or the like may rest on the ground, but is upon a stand of suitable height for feeding calves, and the dish may have connections, as hooks, or clamps, for attachment of the said stand, or these may be on the stand.

Pigs when feeding show such a monopolistic nature, that if small and mature pigs are together, the small one will be put at a disadvantage or be driven away by the larger from any open feeding dish. I provide on any desired part of my dish a fixed or removable grating or the like which obviates such monopoly, as hereinafter explained. I also provide in some cases, slides, shutters, plugs, or the like means, for regulating the passage of food from the receptacle, also a froth stopper and food deflector.

In construction according to this invention there is a circular, or partly circular metal dish, or one approximating to such form, flat bottomed or otherwise, having at a suitably short distance back from the feeding rim or edge, and connected thereto by radial partitions, a food distributing chamber. Both dish and chamber have details explained hereinafter by reference to the accompanying drawings.

Figure 1 is a perspective view of the complete device, partly in section. Fig. 2 is a top plan view of part of the same, partly in section. Fig. 3 is a detail view showing a device for preventing froth from leaving the food receptacle.

Each feeding dish has a narrow rim or top $a$, over which the animals feed, from which the dish wall $b$ slopes inwardly to the bottom $c$, which may be provided with a flange or rim $c'$, if desired, as shown in dotted lines in Fig. 1. On various parts of the wall $b$, on the outside, it is provided with any suitable fastening devices, such as $d$.

$g$ represents the cylindrical food receptacle, which is fixed centrally within the feeding dish. It is secured to said dish by means of a series of radial vertical partitions $e$, riveted to the part $g$ as shown at $f$ and held in position by any suitable attachments, such as the hasps $d'$. The partitions $e$ are curved outwardly at the top, as shown at $e'$, to divide the space between the receptacle and the wall of the dish into separate compartments. The receptacle $g$ has its lower edge apertured or recessed at intervals, such as at $i$, to leave openings or exits for food to pass into the dish, there being one of said openings between each two partitions $e$. The receptacle may be provided with any suitable lifting means, such as a handle $h$. Projecting centrally from the bottom of the food receptacle $g$ is a cone $h'$ adapted to guide the food toward the inner bottom edge of said receptacle.

The flow of the food through the apertures $i$ can be regulated or cut off entirely by means of the movable gates or shutters $j$. These may be raised and lowered by any suitable means, but in the drawing I have shown a rod $t$, passing through guides $r$ on the side of the receptacle $g$, said rod being provided with a handle $p$. This rod is also provided with a screw-threaded portion, meshing with a nut $S'$, carried on the outside of the receptacle $g$. The lower end of the rod $t$ passes through the upper part of the shutter or gate $j$, which is bent over as shown, and on the lower end of the rod $t$ are nuts $S^2$. The gates or shutters $j$ are guided and confined at their sides by the guides $S^3$. From the construction shown, it is obvious that the turning of the handle $p$ will raise or lower the shutter or gate $j$.

A grating, which may be carried over any or all of the compartments is for the purpose of permitting small animals to feed conveniently without fouling the food. This grating consists of bars $V$, which are arranged between curved plates forming a hinged frame $W$, the inner plate being supported by an eye $x$ on the receptacle $g$, the outer plate being fixed on the trough by hasps $e^{11}$, adapted to fit down over fastenings similar to $d$ on the outside of the dish wall $b$.

When feeding calves with skimmed milk, it is necessary to prevent them from drinking froth, and in order to prevent the froth from leaving the receptacle, I insert in the receptacle a band $A^2$ having side holes and notches, as shown clearly in Fig. 3.

The partitions $e$ are provided at their bases with openings $e^2$ between them, so that the food may spread from one compartment to another. This enables the animals to be fed by opening only one of the apertures $i$ and yet prevents the animals from interfering with each other while feeding.

I claim:

1. A feeding trough for animals, consisting of a metal dish having inwardly sloping sides, a feed chamber provided with radial partitions extending outwardly therefrom to the inside of the dish, fastening devices carried by said partitions and dish, respectively, and an apertured froth stopper adapted to fit within said chamber, substantially as described.

2. A feeding trough for animals, comprising a metal dish having inwardly sloping sides, a chamber for the food, provided with outwardly extending partitions making radial compartments in said dish, fastening devices carried by said dish and partitions, respectively, a cone within said chamber, and a removable apertured froth stopper in said chamber, substantially as described.

3. A feeding trough for animals, consisting of a metal dish having inwardly sloping sides, a food compartment or chamber having partitions adapted to fit within said dish and form radial compartments, said chamber having openings near its bottom, fastening devices carried by said partitions and said dish, respectively, a cone located inside said chamber, a removable apertured froth stopper, and means for opening and closing the apertures in the bottom of said chamber, substantially as described.

4. In a trough for feeding animals, the combination of a metal dish having inwardly inclined sides, a chamber adapted to fit within said dish and provided with partitions making radial compartments in said dish, fastening devices carried by said partitions and said dish, a cone in said chamber, a removable froth stopper in said chamber, and a grating adapted to be removably secured between said chamber and said dish, substantially as described.

In witness whereof I have hereunto set my hand in the presence of two witnesses.

ARTHUR BERNARD TAYLOR.

Witnesses:
ALICE M. HOLT,
GEORGE G. TURRI.